3,020,402
AUTOMATIC SIGNAL FINDER
Elihu Brodsky, Brooklyn, and Harold A. Levine, West Hempstead, N.Y., assignors to Loral Electronics Corporation, New York, N.Y., a corporation of New York
Filed Aug. 19, 1955, Ser. No. 529,472
3 Claims. (Cl. 250—20)

This invention relates generally to the field of radio tuning devices, and more particularly to an improved automatic signal finder device for use in conjunction with radar receiving equipment having a motor driven scanning device which tunes the receiving equipment over a predetermined radio frequency band.

Such devices are used by the Armed Forces in conjunction with the reception of radar signals transmitted by enemy transmitters, for the purpose of determining the location of the transmitting station. In use, the invention is directed toward facilitating the finding of signals, and tuning the receiving device to the transmission frequency, following which the directional bearing and other pertinent information may be obtained.

Radar transmission differs from other forms of radio transmission in that the signal transmitted is in the form of a recurring pulse rather than a continuous modulated wave. Thus, signal finders of types designed for conventional radio reception are of no value in radar applications. As signal searching by visual means over long periods of time results in a high degree of fatigue on the part of the operator, it is desirable that automatic means be provided to assist visual observation.

It is therefore among the principal objects of the present invention to provide electronic means for indicating the presence of a radar signal by automatically interrupting the flow of current to a motor-driven scanning device, thereby halting the same at substantially the tuned position corresponding to a received signal.

Another object of the invention lies in the provision of automatic signal finder construction which may be incorporated into existing radar receiving devices without extensive modification.

A further object of the invention lies in the provision of automatic signal finder construction employing a relatively few number of electrical and mechanical components, thereby simplifying servicing and installation of the device as required.

Still another object of the invention lies in the provision of a device of the class described which will automatically halt the sweeping action of the tuning component of a radar receiving device, and which will simultaneously call attention to the operator of the presence of a received signal.

These objects and features, as well as other incidental ends and advantages, will become more clearly apparent during the course of the following disclosure, and be pointed out in the appended claims.

On the drawing, to which reference will be made in the specification, similar reference characters have been employed to designate corresponding parts throughout the several views.

Figure 1:
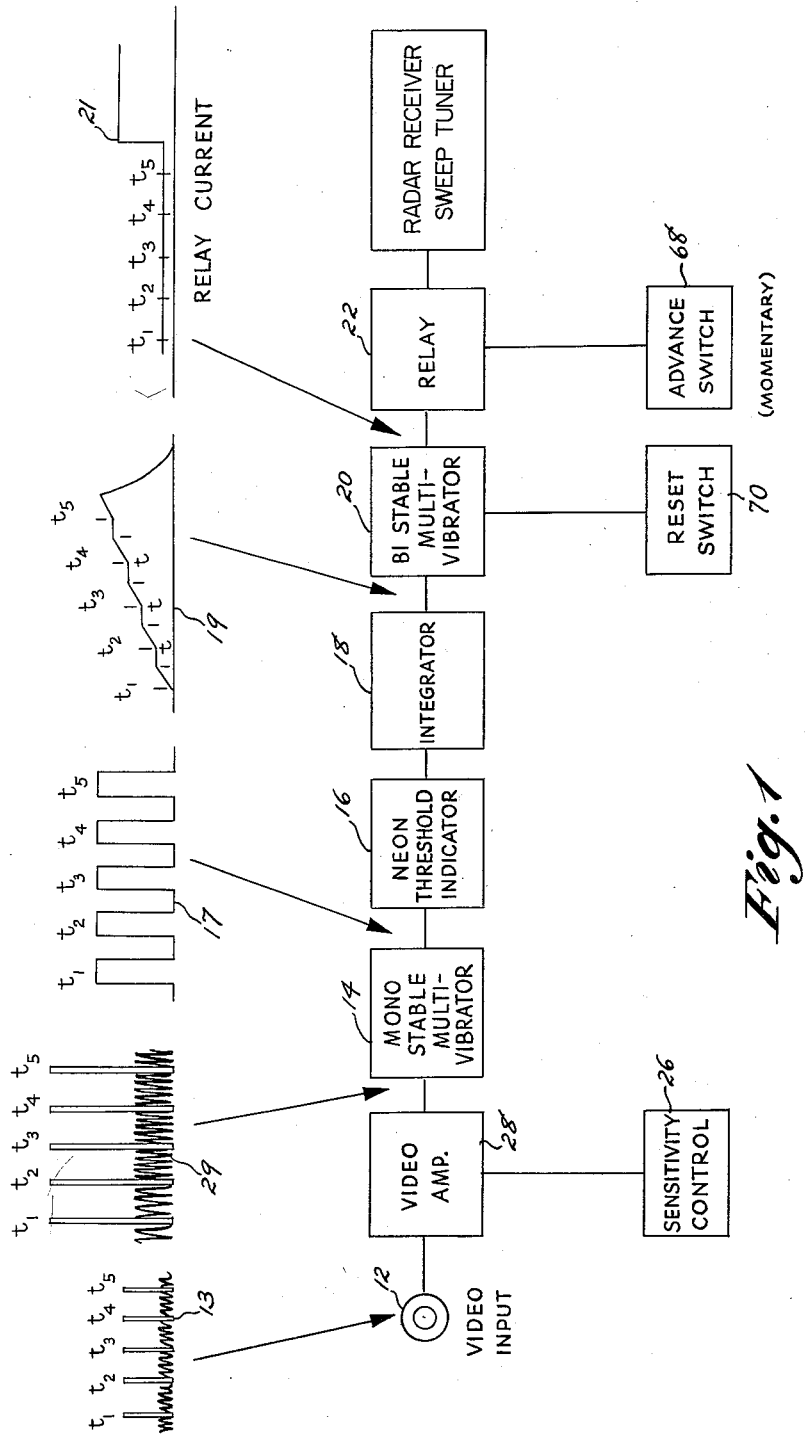
FIGURE 1 is a block diagram of an automatic signal finder embodying the invention.

In accordance with the invention, the device comprises: video input means 12, uniform pulse generating means 14, threshold indicator means 16, integrating means 18, triggering means 20, and relay means 22.

Before entering into a detailed consideration of the component elements, it is believed that a short description of the operation of the device will facilitate comprehension of the same.

During operation of a normal radar receiving means, the scanning motor performs its sweep over the range of frequencies for which it is adjusted without interruption. Assume a signal of given frequency to be received, as indicated on the graph, indicated by reference character 13 on FIGURE 1, wherein $T_1$, $T_2$, $T_3$, $T_4$, and $T_5$ represent intervals of time. Through the level or sensitivity control 26, the signal is amplified by the video amplifier 28, the graph 29 representing the amplitude of the signal at this point. Next, the received signal is fed to the uniform pulse generating means 14, preferably in the form of a mono-stable multi-vibrator, which transforms the pulses received to the uniform amplitude and uniform width represented by the graph indicated by reference character 17. The pulses are then fed to a threshold indicating means 16 which indicates that a signal is being received, and thence to an integrator means 18 which stores the received pulses in a capacitor, the charge building up as indicated by graph 19. When the charge within the integrating means 18 has reached a pre-determined point, triggering means 20, preferably in the form of a bi-stable multi-vibrator, energizes a relay means 22, which relay operates switches which arrest movement of the scanning motor of the radar receiver, illuminates an indicator lamp advising the operator that scanning motor has stopped, and controlling any remote equipment desired.

Figure 2:
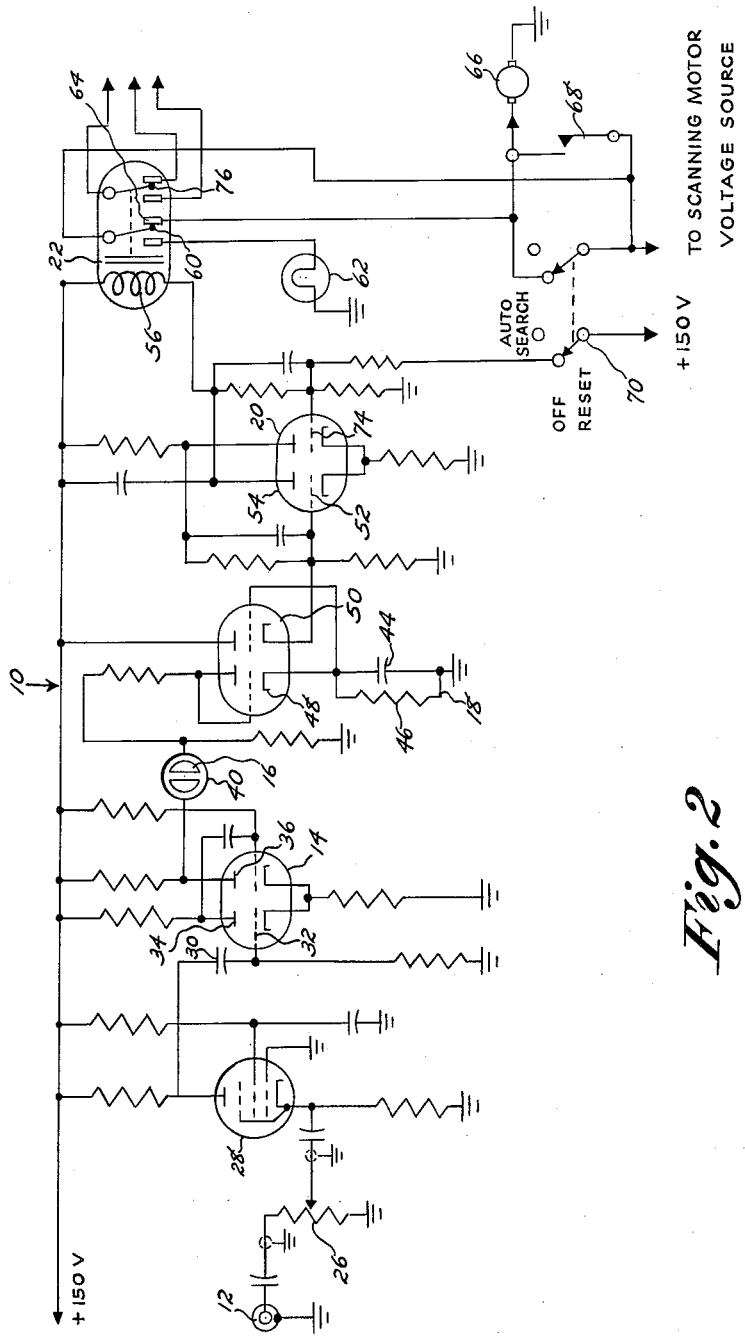
FIGURE 2 is a schematic diagram of the embodiment.

This method of operation may be modified to adapt the same to the individual equipment employed by those skilled in the art to which the invention relates. With the foregoing in mind, reference may now be made to FIGURE 2 of the drawing wherein there is shown a schematic diagram of a typical embodiment of the invention. It is to be understood that the vacuum tube components, as well as the resistance and capacitance shown are purely exemplary, and will, of course, vary with substitution of other vacuum tube components having different tube characteristics, but which are capable of performing the same functions, as is well understood in the art.

The video input jack means 12 is included to permit the device 10 to be connected with the video output of the radar receiver. This signal passes through a sensitivity control 26 which is so adjusted as to prevent various types of interference generally classified under the generic name "noise" from activating the mono-stable multi-vibrator 14 and hence the threshold indicator means 16, which is preferably in the form of a neon tube.

As indicated on FIGURE 1, the signal from the sensitivity control is amplified by a grounded grid pentode amplifier 28. Pulses from the plate of the amplifier 28 are coupled through a capacitor 30 to the grid 32 of the normally non-conducting section of the mono-stable multi-vibrator 14. These are positive pulses, and cause the non-conducting section 34 of the multi-vibrator 14 to become conducting, thus cutting off the normally conducting portion 36 of the multi-vibrator 14. As the non-conducting section 34 becomes conducting, the normally conducting section 36 becomes non-conducting, thus producing a positive pulse at the plate of the normally non-conducting section 36. One such pulse is produced for each incoming video pulse.

The output of section 36 is coupled through the neon glow lamp 40, which in this embodiment, comprises the threshold indicator means 16, to the integrator means 18 which includes capacitor 44, and resistor 46. This current passes through the charging diode 48 which permits current to flow only to the capacitor 44, while blocking return of such current.

The integrated signal is coupled to the direct-coupled cathode follower 50, the output of which raises the voltage on the grid 52, the normally non-conducting section of the bistable multi-vibrator 54 which forms the triggering means 20, described hereinabove.

When a sufficient number of pulses have been integrated, the non-conducting section of the multi-vibrator will become conducting, and the coil 56 of the relay means 22 will be energized (see graph 21). The time constant of the integrating circuit 18 is selected so that random noise peaks which have sufficient amplitude to trigger the mono-stable multi-vibrator 14 will not cause the charge on capacitor 44 to build up to the level required to trigger the bistable multi-vibrator 54. This serves to avoid operation of the relay on noise impulses. Movement of the contact 60 will then close the circuit to the indicator lamp 62, while the opening of contact 64 will interrupt the flow of current to the sector sweep motor 66, thereby arresting the tuning action at this point. Relay contacts 76 may be used for the control of auxiliary indicators, or other associated equipment.

The motor may be energized manually by means of the switch 68 for momentary movement of the sector motor. The entire device may be disconnected by moving the reset switch 70 to the off or reset position.

In the latter above-mentioned position, positive voltage is applied to the grid 74, the normally conductive (made non-conductive by the signal) side of the bistable multi-vibrator 54 making it once again conductive, and returning the output of the same to its initial condition, as indicated by the graph 21 on FIGURE 1. For further operation, the switch is again returned to the auto-search position.

It may thus be seen that we have invented novel and highly useful improvements in automatic signal finders for use in conjunction with radar receiving devices, wherein the operator of the receiving device is relieved from the necessity of maintaining constant and fatiguing attention to the operation of the device throughout extended periods of time. Means are provided for instantly signaling to the operator upon the occurrence of a received signal, and for arresting the sector sweep motor tuning device at the point where a signal is received. By adjusting the control level of the received signal, it is possible to eliminate substantially all extraneous interference, while permitting the device to operate where the received signal strength is but slightly over that of the noise. The device comprises relatively few and standard components, thereby permitting the same to be manufactured at a reasonably low cost.

We wish it to be understood that we do not consider the invention limited to the exact details of structure shown and set forth in this specification, for obvious modifications will occur to those skilled in the art to which the present invention pertains.

We claim:

1. In a radar receiver including a motor-driven sweep tuner, the improvement comprising means for interrupting the flow of current to the motor of said sweep tuner comprising: means for receiving the video output of said receiver, amplifying means for increasing the strength of said video output, monostable multivibrator means connected to said amplifying means and responsive to a pulsed signal from said radar receiver to provide a corresponding pulse of constant amplitude and width, integrating means including a capacitor receiving the incremental output of said monostable multivibrator, triggering means including a bistable multivibrator operated by the reaching of said capacitor of a predetermined degree of charge, relay means controlled by operation of said bistable multivibrator for interrupting said flow of current, and means for resetting said bistable multivibrator after discharge of said condenser.

2. In a radar receiver including a motor-driven sweep tuner, the improvement comprising means for interrupting the flow of current to the motor of said sweep tuner comprising: means for receiving the video output of said receiver, amplifying means for increasing the strength of said video output, monostable multivibrator means connected to said amplifying means and responsive to a pulsed signal from said radar receiver to provide a corresponding pulse of constant amplitude and width, integrating means including a capacitor receiving the incremental output of said monostable multivibrator, triggering means including a bistable multivibrator operated by the reaching of said capacitor of a predetermined degree of charge, relay means controlled by operation of said bistable multivibrator for interrupting said flow of current, and means for manually resetting said bistable multivibrator after discharge of said condenser.

3. In a radar receiver including a motor-driven sweep tuner, the improvement comprising means for interrupting the flow of current to the motor of said sweep tuner comprising: means for receiving the video output of said receiver, amplifying means for increasing the strength of said video output, monostable multivibrator means connected to said amplifying means and responsive to a pulsed signal from said radar receiver to provide a corresponding pulse of constant amplitude and width, threshold indicator means actuated by the output of said monostable multivibrator means, integrating means including a capacitor receiving the incremental output of said monostable multivibrator, triggering means including a bistable multivibrator operated by the reaching of said capacitor of a predetermined degree of charge, relay means controlled by operation of said bistable multivibrator for interrupting said flow of current, and means for manually resetting said bistable multivibrator after discharge of said condenser.

References Cited in the file of this patent
UNITED STATES PATENTS

| | | |
|---|---|---|
| 2,422,334 | Bedford | June 17, 1947 |
| 2,428,058 | Wise | Sept. 30, 1947 |
| 2,491,029 | Brunn | Dec. 13, 1949 |
| 2,499,584 | Hills | Mar. 7, 1950 |
| 2,500,347 | Cole | Mar. 14, 1950 |
| 2,550,430 | Schwarz et al. | Apr. 24, 1951 |